United States Patent
Mu et al.

(10) Patent No.: US 9,660,487 B1
(45) Date of Patent: May 23, 2017

(54) INTELLIGENT WIRELESS POWER TRANSFERRING SYSTEM WITH AUTOMATIC POSITIONING

(71) Applicant: Megau LLC, Santa Clara, CA (US)

(72) Inventors: Mingkai Mu, Newark, CA (US);
Zhong Nie, San Mateo, CA (US)

(73) Assignee: Megau LLC, Santa Clara, CA (US)

( * ) Notice: Subject to any disclaimer, the term of this patent is extended or adjusted under 35 U.S.C. 154(b) by 0 days.

(21) Appl. No.: 15/181,196

(22) Filed: Jun. 13, 2016

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 50/90* | (2016.01) |
| *H02J 50/60* | (2016.01) |
| *H02J 50/80* | (2016.01) |
| *H02J 50/70* | (2016.01) |

(52) U.S. Cl.
CPC ............ *H02J 50/10* (2016.02); *H02J 50/60* (2016.02); *H02J 50/70* (2016.02); *H02J 50/80* (2016.02); *H02J 50/90* (2016.02)

(58) Field of Classification Search
CPC .. H02J 7/025; H02J 7/027; H02J 7/045; H02J 5/005; H02J 17/00; B60L 11/182; B60L 11/1838
See application file for complete search history.

(56) References Cited

U.S. PATENT DOCUMENTS

| | | | |
|---|---|---|---|
| 5,498,948 A | 3/1996 | Bruni et al. | |
| 5,617,003 A | 4/1997 | Odachi et al. | |
| 5,654,621 A | 8/1997 | Seelig | |
| 5,821,731 A * | 10/1998 | Kuki | B60L 11/1805 320/108 |
| 2008/0061733 A1 * | 3/2008 | Toya | H02J 7/025 320/103 |
| 2010/0235006 A1 * | 9/2010 | Brown | B60L 11/182 700/286 |
| 2012/0050535 A1 * | 3/2012 | Densham | H04N 5/2224 348/159 |
| 2012/0095617 A1 * | 4/2012 | Martin | B60L 11/1833 701/1 |
| 2013/0038138 A1 * | 2/2013 | Cook | H01Q 1/248 307/104 |
| 2014/0132207 A1 | 5/2014 | Fisher | |
| 2015/0015180 A1 * | 1/2015 | Miller | H02J 7/025 320/103 |
| 2015/0204928 A1 * | 7/2015 | Hoover | H02J 7/0042 320/108 |
| 2015/0349555 A1 * | 12/2015 | Ortiz Baeza | H02J 7/0044 320/111 |
| 2016/0178740 A1 * | 6/2016 | Sieber | B60L 11/1838 342/43 |
| 2017/0001527 A1 * | 1/2017 | Prokhorov | B60L 11/182 |

* cited by examiner

*Primary Examiner* — Rexford Barnie
*Assistant Examiner* — Rasem Mourad
(74) *Attorney, Agent, or Firm* — WPAT, P.C., Intellectual Property Attorneys; Anthony King

(57) ABSTRACT

An automatic-positioning wireless power transfer system to wirelessly charge power to an object and is also capable of wirelessly harvesting power from an object. The power transfer system consists of a mobile housing configured to autonomously move about the object, and has a tiltable transceiver. The mobile housing can be tethered to a base station via a cable, or not physically tethered to a base station when it travels.

18 Claims, 7 Drawing Sheets

INTELLIGENT WIRELESS POWER TRANSFERRING SYSTEM WITH AUTOMATIC POSITIONING

FIELD OF THE DISCLOSURE

The field of the disclosure is electricity charging systems generally and specifically, wireless charging of electric vehicles as well wireless harvesting of electricity from various electricity-storage devices.

BACKGROUND OF THE DISCLOSURE

Wireless chargers are known in the art. Wireless charging, however, requires that the two coils (one from the transmitting side, and one from the receiving side) line up. For example, when it comes to wirelessly charging electrically-powered cars, there is a continuing need for new ways to line up two coils to improve charging efficiency. Generally known methods of lining up the two coils include a stationary transceiver in or on the ground and then drive the car over the transceiver. Despite numerous desirable properties, the stationary transceiver has several disadvantages. For example, the coils need to be large to tolerate misalignment and the distance between the coils needs to be large, as well. The combination of large coils and large distance between the coils reduces the efficiency and increases the density of electromagnetic radiation necessary. Some prior works have tried to reduce the misalignment. U.S. Pat. No. 5,498,948, all of which is herein incorporated by reference, uses an adjustable arm on a stationary transmitter to control the alignment between two coils. It is complicated and less flexible. U.S. Pat. No. 5,617,003A, all of which is herein incorporated by reference, uses the similar idea of a movable arm to adjust the position of the transmitter coil. U.S. Pat. No. 5,654,621A, all of which is herein incorporated by reference, installs a stationary arm underground to align the coils. U.S. Patent Application Publication No. 20140132207, all of which is herein incorporated by reference, detects the misalignment and adjusts the vehicle's position to align the coils. All these solutions are either complicated or offers less flexibility. Thus, there remains a considerable need for better devices and methods that can automatically position the coupling coils for wireless charging of electric vehicles.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

BRIEF SUMMARY OF THE DISCLOSURE

In the present disclosure, apparatus and methods are provided in which power is wirelessly transferred both to and from a self-positioning wireless power transfer system. The power transfer system has a mobile housing configured to autonomously and freely move about and change direction in different directions. In one embodiment, there is a transceiver I disposed on the mobile housing configured to transmit power wirelessly, or to receive power wirelessly, or both. In another embodiment, there is a base station coupled to the mobile housing which the transceiver I is coupled to.

In one embodiment of the present disclosure, the contemplated power transfer system may also contain at least one sensor to detect a location and/or shape of a Transceiver II on the object in need of power transfer and a logic to derive detected location data. The power transfer system can include at least one attachable tracker configured to be attached in close proximity to the transceiver II of the object and the sensor senses attachable trackers to detect the location of transceiver II.

It is further contemplated that the power transfer system may include a communication module configured to recognize a manufacturer's specification of the object, and will derive transceivers' location data, status, commands, etc. The power transfer system may also be connected to a communications network such as the Internet. The wireless transfer system may then move transceiver I horizontally (via movement of the mobile housing), elevate transceiver I vertically, tilt transceiver I, or perform any combination of the three movements/functions to orient itself in response to the detected location data.

In another aspect of this embodiment, the power transfer system automatically aligns transceiver I with transceiver II located in the object needing power. The power transfer system may autonomously move transceiver I towards transceiver II or autonomously move transceiver II towards transceiver I. The wireless transfer system may then move the transceiver II horizontally, elevate the transceiver II vertically, tilt the transceiver II, or perform any combination of the three movements/functions to orient itself in response to the detected data about where the transceiver I is. It is also contemplated that the power transfer system automatically moves transceiver I and/or transceiver II away from the object when power transfer is completed.

In an alternate embodiment, it is contemplated that transceiver I is configured to align with transceiver II by detecting and calculating the location of a center of a coil in transceiver II or detecting the locations of at least two detachable trackers previously attached near transceiver II. It is further contemplated that the power transfer system will shorten the inductive coupling distance to no more than 15 cm. In yet another embodiment, the power transfer system will shorten the inductive coupling distance to no more than 20 cm. In still another embodiment, the power transfer system will shorten the inductive coupling distance to no more than 10 cm. In a further embodiment, the power transfer system will shorten the inductive coupling distance to no more than 5 cm.

In another embodiment, it is contemplated that mobile housing may be coupled to a base station either via a cable retractable at either or both ends of the cable, or the mobile housing may be physically untethered to the base station when the mobile housing is transferring power between transceiver I and II. For some of the embodiments where the mobile housing is physically untethered to the base station, the mobile housing can be charged by the base station wirelessly, and can have an internal power storage unit to store power as it freely moves untethered. In other embodiments, the mobile housing is not tethered to the base station by a cable, and can physically dock into the base station so as to be charged by the base station. Among the various other embodiments contemplated, power transfer systems may also be used to transmit power to, or receive power from, transceiver II located on land vehicles, water crafts, aircraft, stationary machines, mobile machines, robots, or even solar panels.

In most of the embodiments shown herein, the contemplated system has a mobile housing that enjoys a degree of freedom to autonomously move about a car, and the driver of the car need not park within a designated space. Prior art wireless charging pads with robotic arms would require that the car be park within a specific space, so the car's transceiver could be within reasonable reach of the robotic arm. It is not feasible to build long robotic arms that could reach across the parking lot. Also, installing robotic arms in garages or parking lots are cost-prohibitive.

Various objects, features, aspects and advantages of the present embodiment will become more apparent from the following detailed description of embodiments, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENT

Figure 1:
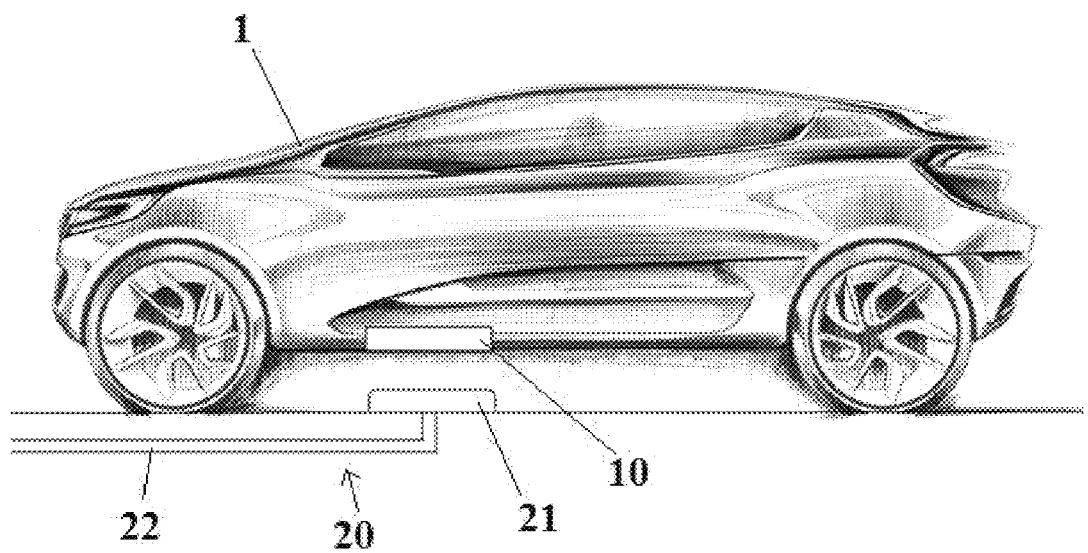
FIG. 1 is a side view of a prior art wireless charging system embedded in the ground and lined up with the vehicle transceiver. In this prior art illustration, none of the transceivers are movable in relation to what it is attached to. The only movable portion in this illustration is the vehicle itself.

A wireless power transfer system and its various embodiments can now be better understood by turning to the following detailed description, which are presented as illustrated examples of what are defined in the claims. It is expressly understood that the embodiments as defined by the claims may be broader than the illustrated embodiments described below.

Many alterations and modifications may be made by those having ordinary skill in the art without departing from the spirit and scope of the embodiment. Therefore, it must be understood that the illustrated embodiments have been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described below as acting in certain combinations and even initially claimed as such, it is to be expressly understood that one or more elements from a claimed combination can in some cases be excised from the combination and that the claimed combination may be directed to a subcombination or variation of a subcombination.

As used herein, the terms "automatically" and "autonomously" in conjunction with the movement of the transceivers refer to the transceiver's ability to move itself relatively to what it is attached to, and move/tilt in a direction that would align with another transceiver without user intervention or user instruction. In some embodiments a user is required to actively and selectively "turn on" the power transfer mode, or in other words, to "tell" the system to begin aligning the two transceivers together. In other embodiments, a user is not required to actively and selectively "turn on" the power transfer mode, and the system would begin to align the two transceivers together when certain conditions are met. In either instances, the terms "automatically" and "autonomously" in conjunction with the movement of the transceivers refer to the time sequence that begins after the power transferring system has received some kind of command (either a user-initiated command or a system-initiated command) to start the alignment process, and ends when the two transceivers are aligned as intended and discussed herein.

As used herein, the terms "automatically" and "autonomously" in conjunction with the movement of the mobile housing refer to the ability of the mobile housing to move in any direction around and below the object without user intervention or instruction. In other words, the mobile housing is self-driven and determines for itself the direction and speed of travel. As used herein, the term "transceiver" refers to a transmitter, a receiver, or both. An example of a transmitter is a charging pad. An example of a receiver is a power receiving pad. The transceiver can have a coiled structure embedded within, or it can use other types of known or yet-to-be-known technology requiring no coil at all.

As used herein, the term "alignment" refers to the transceivers being placed in positions relative to each other that promote more efficient inductive power transfer. In some embodiments this specifically means having the centers of both coils (from transceiver I and II) match each other in location, the planes of each coil parallel to each other, and two coils are placed close within certain distance.

FIG. 1 generally depicts a prior art charging system 20 where the charging pad 21 containing transceiver I is stationary, non-mobile and coupled to a power source by a cable 22. A car 1 that needs power charging is positioned such that the embedded transceiver II 10 is in alignment with the charging system 20. Transceiver II 10 does not move relative to the car 1 which the transceiver is attached to. Similarly, charging pad 21 is not movable relative to the ground which the charging pad 21 is attached to. And the coupling system between two transceivers needs to be large in size so as to tolerate certain degrees of misalignment. The distance between the two transceivers needs to be 20 cm or above, which is the usual clearance of the car bottom to the ground.

Figure 2:
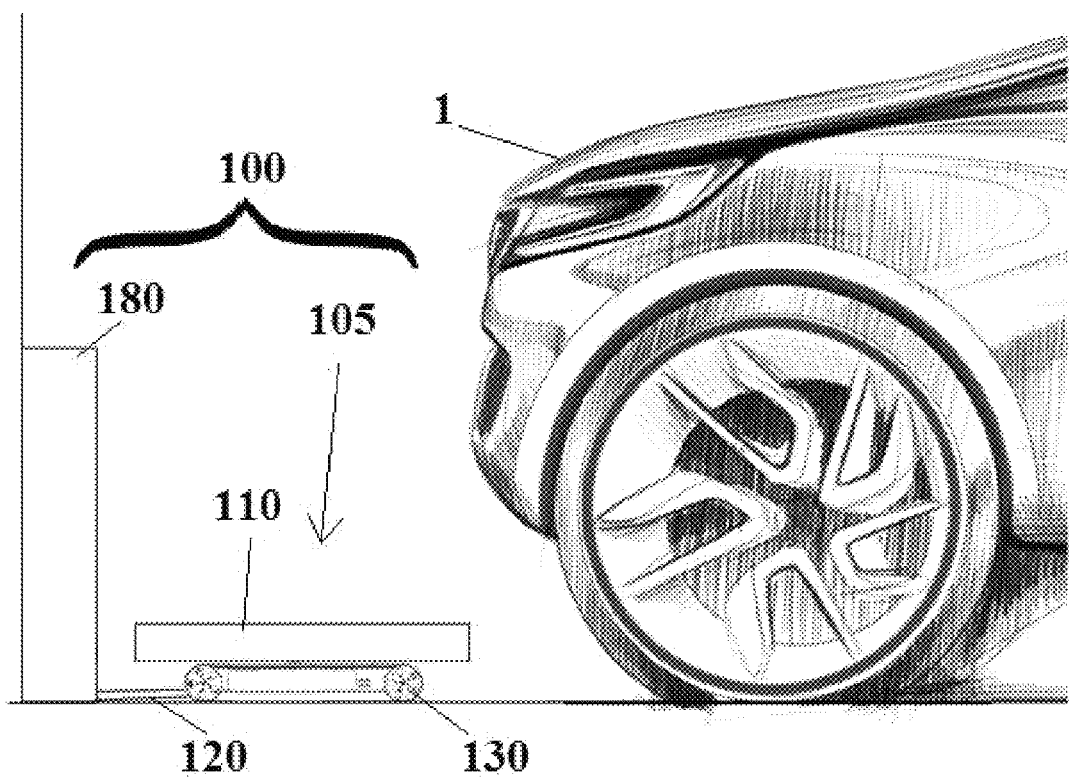
FIG. 2 is a side view of one embodiment of the power transferring system and the front of a vehicle. The power transferring system has a cable tethered to a base station, which is coupled to a power source.

Now referring to FIGS. 2-5, wherein similar components are identified by like reference numerals, there is seen in FIG. 2 an embodiment of a wireless power transfer system 100 depicted as including a transceiver I 110, and a cable 120 physically coupling the mobile housing 105 to a base station 180. The base station 180 can be installed on the wall of a garage, and can be installed on wall or on a pole in front of a parking space. The base station 180 can also be installed onto various structures or locations to facility easy access to a parked car 1. Contemplated base station 180 is configured to transfer power to and from the mobile housing 105, and the base station is in turn coupled to a power source such as a power grid 307 (see FIGS. 8-9). As will be discussed below, the power transferring system 100 can be merely a charger to charge a car 1, or a collector of electricity from a source of electricity (e.g., a solar panel 304, a car having stored electricity either from its solar panel or from a previous charge) or both. As will be discussed below and shown in other figures, the mobile housing 105 can also be physically untethered to the station/base station 180.

Figure 3:
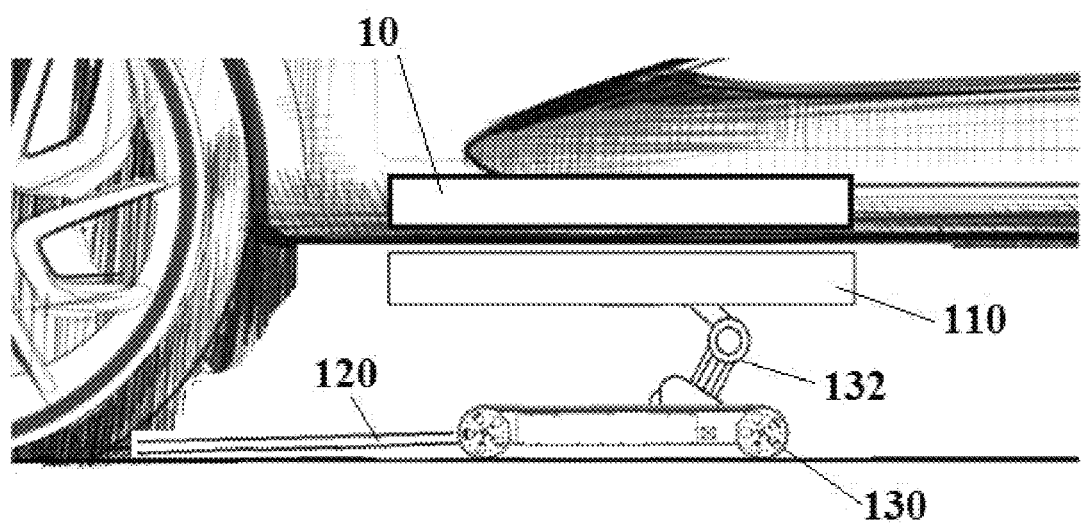
FIG. 3 is a side view of one embodiment of the mobile housing oriented with regards to a transceiver embedded in a vehicle.
Figure 4:
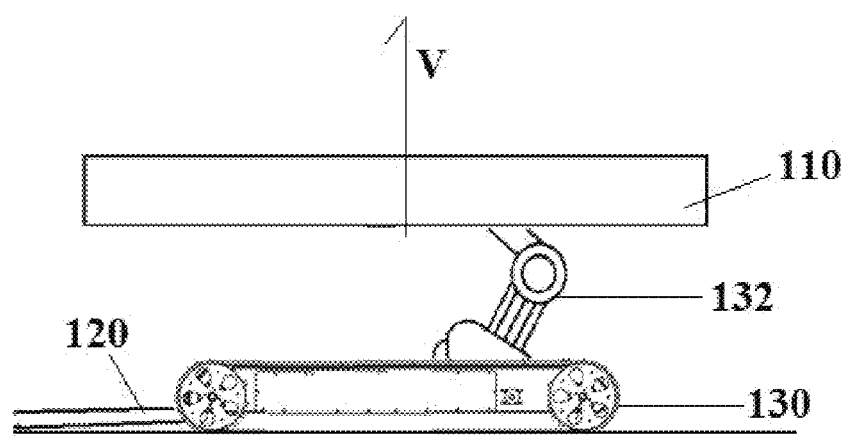
FIG. 4 is another side view of the mobile housing of FIG. 3.
Figure 5:
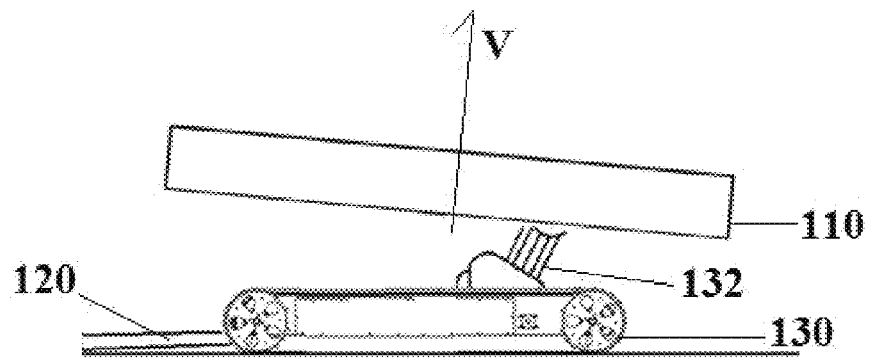
FIG. 5 is another view of the mobile housing of FIG. 4, with the transceiver I in a tilted position.

As seen in FIGS. 3, 4, and 5, an embodiment of the mobile housing 105 has wheels 130 to freely position itself close to a transceiver II 10, which can be embedded under a car 1. There can be one, two, or a plurality of wheels 130. The mobile housing 105 is configured to change a direction of its travel to freely and autonomously move about the car 1. The transceiver I 110 can also autonomously move in various directions to align with transceiver II 10. In some embodiments, wheels 130 are not necessary and thus not provided, as long as there is a way of moving the mobile housing 105 and the transceiver I 110 in multiple directions to align with the transceiver II 10. For example, it can use robotic legs to move about.

Figure 10:
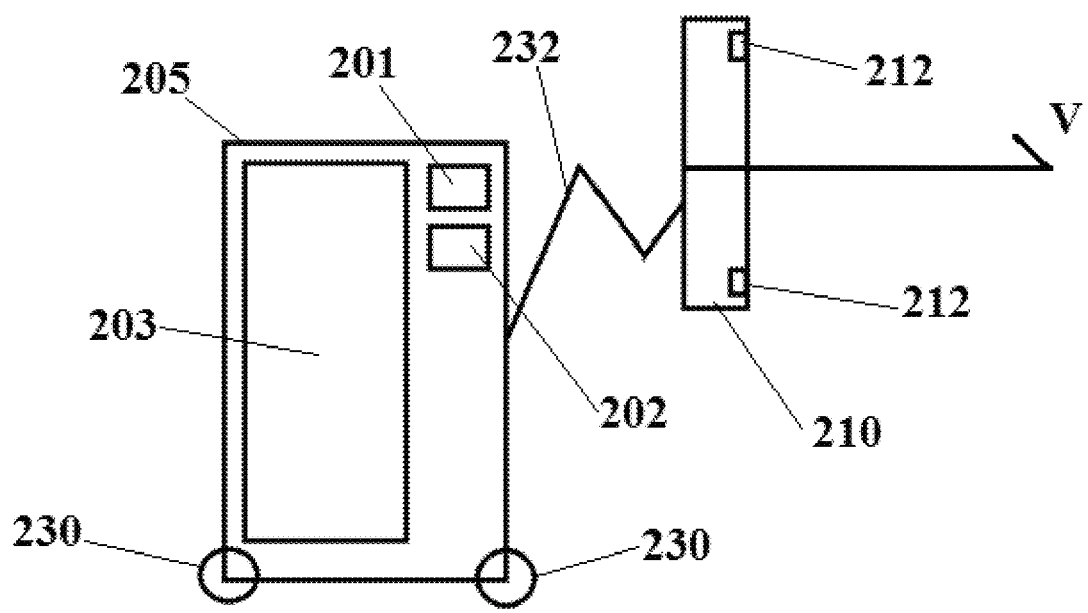
FIG. 10 is a side view of one embodiment of the mobile housing where the transceiver extends to the side of the mobile housing and can tilt into a vertical position, and wherein there is an internal power storage within the mobile housing. In this embodiment the mobile housing is not physically tethered to the base station via a cable.

As shown in FIGS. 3-5, the power transferring system 100 can position transceiver I 110 at an ideal distance from transceiver II via a retractable arm 132 that raises transceiver I 110 vertically and tilts the transceiver I 110 at an angle as needed. Transceiver I 110 has a transmission vector V, which has a direction that is perpendicular to a plane of the transceiver I. The transceiver I 110 is configured to tilt relative to the mobile housing, thereby causing said vector V to tilt between a zero degree angle (as shown in FIG. 4) to a 90 degree angle (as shown in FIG. 10).

Although the above embodiments disclose using a retractable arm 132 to elevate and tilt the transceiver I 110, it should be understood that other structural mechanisms may be used to elevate and tilt transceiver I 110 to properly orient the transceiver I 110 with regard to an embedded transceiver II 10. Transceiver II 10 can also move, in some embodiments, towards transceiver I 110 for better alignment and closer distance. For example, transceiver I 110 or transceiver II 10 may be supported by four vertical columns (not shown) each of which can independently move up and down, thereby vertically moving and tilting transceiver I 110 or transceiver II 10.

Figure 6:
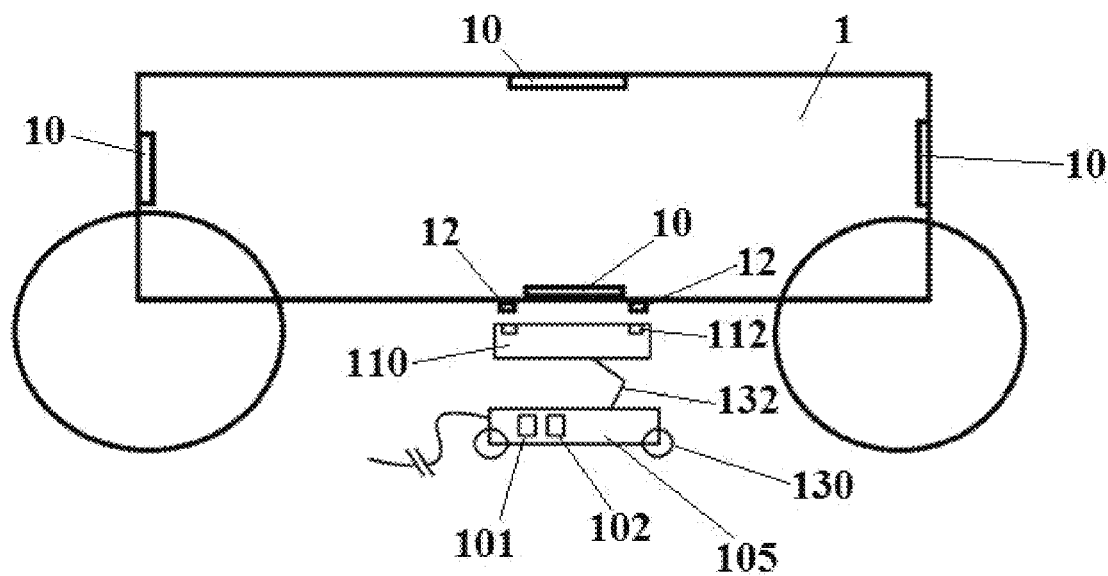
FIG. 6 is a side view of one embodiment of the mobile housing where the mobile housing is oriented properly with transceiver II embedded under the vehicle by sensing detachable trackers placed around the vehicle transceiver. This vehicle is also shown having transceivers on its sides to illustrates that the mobile housing is capable of extending and tilting its transceiver I to accommodate transceiver II that are located on a side of a vehicle.

FIG. 6 shows a more detailed view of one embodiment of the disclosed power transferring system 100 that aligns a transceiver I 110 with a transceiver II 10 embedded in a car 1. Transceiver I 110 has a retractable arm 132 to elevate and tilt transceiver I 110 to align it with a transceiver II 10. The mobile housing 105 also can include a communication module 101, a plurality of wheels 130, and at least one sensor 112 that detects the location of at least one detachable tracker 12 placed near transceiver II 10.

The car 1 in FIG. 6 illustrates various possible locations for the transceiver II 10, all of which can be accommodated by the contemplated transceiver I 110 due to its ability to tilt, and the ability of its retractable arm to reach. Transceiver II 10 is contemplated to be located on top of a car 1, on the side of a car 1, and at the bottom of a car 1. The herein disclosed power transfer system 100 is specifically contemplated to reach any such location of transceiver II 10. The retractable arm 132 can be sufficiently long.

The contemplated communication module 101 can recognize a manufacturer's specification of the object, and the logic is configured to derive the detected location data by using the manufacturer's specification in relation to other structural parts of the object. For example, the manufacturer's specification may indicate that the transceiver II 10 is located at a certain distance relative to the four wheels, thereby allowing the contemplated power transfer system to locate the exact location of the transceiver II 10 by first detecting the physical location of the car's four wheels.

Transceiver I 110 is capable of inductively transferring (transmitting, or receiving, or both) power from transceiver II 10. Transceiver I and II may be a coupling coil or any other device capable of transferring power through induction as would occur to those skilled in the art.

Contemplated mobile housing may have a control module 102 having a logic. The control module 102 can detect and send command to initiate automatic alignment by moving and tilting transceiver I 110.

The transceiver I 110 is specifically contemplated to be able to provide charge (transmit power) and to harvest power (receive power). The control module 102 can automatically determine between a transmitting mode and a receiving mode, wherein the transmitting mode transmits power to the car 1, and wherein the receiving mode receives power from the car 1 (power that are collected by the car's solar panels, for example).

The sensors 112 may be infrared, ultrasonic, laser or camera, or any known or yet-to-be-known types of sensors to detect an object or trackers 12 moving in its operating region. Data collected by the sensors 112 are transmitted to a communication module 101. The communication module 101 is connected to a logic that processes the collected data to make the determination on whether or not proper alignment has been achieved. The contemplated communication module 101 can also communicate with a processor or computer in the car 1, to receive instruction from the car 1 directly. For example, the car 1 may signal the communication module 101 that no power charging is needed. In another example, the car 1 may send the communication module 101 a location data that specifically defines the location of its transceiver II 10. Once the car 1 confirms that it is ready to be charged or discharged, sensors 112 scan for the location and orientation of trackers 12, transceiver II 10, or nearby terrain patterns and obstacles (not pictured) and guide the power charging system 100 to transceiver II 10 while recording the optimum route. The sensors 112 then detect the distance and angle between transceiver I 110 and transceiver II 10 and in conjunction with communication module 101, guide the movement of transceiver I 110 until transceiver I is in good alignment and parallel with transceiver II 10, and no more than 15 cm apart from the transceiver II. In one embodiment, the system guides the movement of the first transceiver 110 until the first transceiver is no more than 20 cm apart from the second transceiver. In yet another embodiment, the system guides the movement of the first transceiver 110 until the first transceiver is no more than 10 cm apart from the second transceiver. In a further embodiment, the system guides the movement of the first transceiver 110 until the first transceiver is no more than 5 cm apart from the second transceiver.

Once the power transfer is complete, the communication module 101 receives signal from the car 1 and the logic of the power transferring system 100 instructs relevant moving parts to return to its original position.

Figure 7:
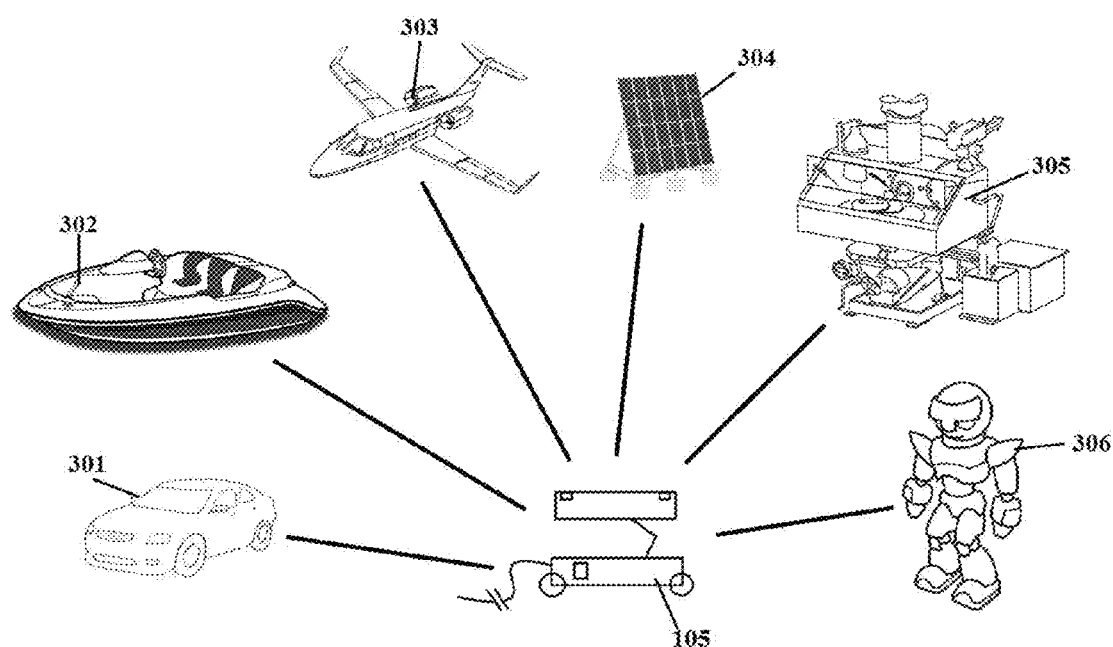
FIG. 7 shows that one design of the contemplated mobile housing is to be capable to couple with and transfer power with a multitude of different electric devices/vehicles.

FIG. 7 illustrates another embodiment of the disclosure where the power transfer system 100 can wirelessly transfer power to and/or from a land vehicle 301, a water craft 302, an aircraft 303, a solar panel 304, a stationary machine 305 or a robot 306. The land vehicle 301, water craft 302, aircraft 303, solar panel 304, stationary machine 305 and robot 306 all contain an embedded transceiver II (not pictured) that the power transfer system 100 will sense and align with. The power transfer system 100 may also transfer to and/or from other foreseeable objects that use power. The depicted objects are shown merely for demonstrative purposes and should not be considered limiting the range of use of the power transfer system 100.

In the case of a solar panel 304, the contemplated power transferring system 100 can autonomously travel within a field with a large number of solar panels 304 installed. The power transferring system 100 can harvest power from these solar panels 304, obviating the need to install intricate and long distance power cable connecting each solar panel to a power harvesting station.

In yet another embodiment, cars 1 or other vehicle types can have solar panels installed, collecting and converting solar energy to electric energy all day. When the car 1 returns home at night, the contemplated power transfer system 100 can harvest such electric energy from the car 1.

Figure 8:
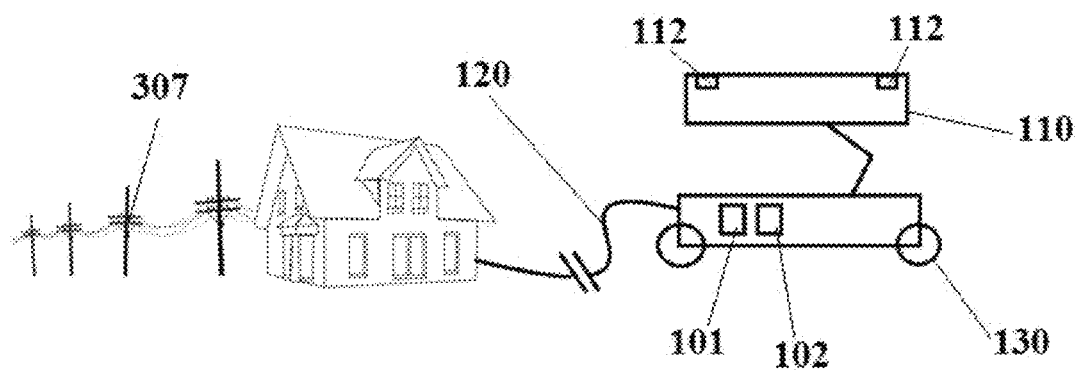
FIG. 8 is a graphical representation of one embodiment of the power transfer system where the mobile housing is coupled to base station via a cable, and the base station is coupled to a power grid.
Figure 9:
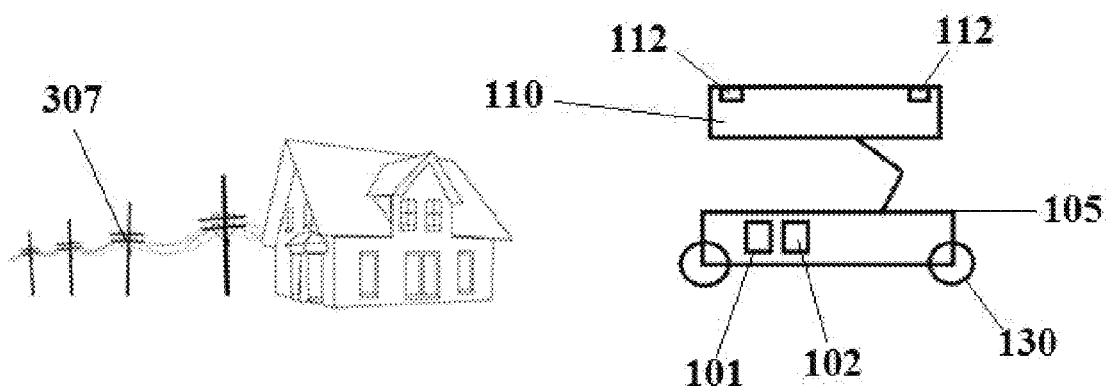
FIG. 9 shows one embodiment of the power transfer system where the mobile housing is not physically tethered to the base station via a cable, and the base station is coupled to a power grid.

As shown in FIGS. 8 and 9, the contemplated mobile housing 105 can be either (a) physically tethered to the base station via only a cable (FIG. 8), when the mobile housing freely moves about the object and when the mobile housing 105 is transferring power to a car 1, or (b) not physically tethered (FIG. 9) to the base station when the mobile housing freely moves about the object, and when the mobile housing 105 is transferring power to a car 1. In the embodiment shown in FIG. 9, the mobile housing 105 can dock at the base station when the mobile housing completes transferring power to or from the object. In other embodiments, the mobile housing 105 of FIG. 9 does not physically dock with the base station, instead, the mobile housing 105 of FIG. 9 can move closer to the base station and transfer its stored power with the base station wirelessly by ways similarly disclosed herein.

As discussed earlier, the contemplated cable 120 may be retractable and may be retracted into the mobile housing 105 of a power transfer system 100. In yet another embodiment, the cable 120 may be retracted into the base station (not pictured), or the mobile housing 105, or both. Contemplated cable 120 can be stored either in the mobile housing 105 or in the base station 108, or both. As the mobile housing moves about the car 1, the cable can be extended and retracted. The cable 120 may be quite long, allowing the mobile housing 105 to freely travel about one car 1, or multiple numbers of cars in a parking lot. The untethered embodiment of FIG. 9 can enjoy a much farther range of travel without being hindered by the length of cable 120. As will be discussed later, the untethered embodiment can have a power storage within the mobile housing 105. As such, the untethered mobile housing of FIGS. 9 and 10 can travel through tight spaces in a field of solar panels 304 to harvest power from these solar panels 304.

FIG. 10 shows the untethered embodiment of the mobile housing 205. In this embodiment, the mobile housing 205 includes wheels 230 and a transceiver I 210 that can extend horizontally via a retractable arm 232. In this embodiment, the mobile housing 205 can contain an internal power storage 203, a communication module 201, a control module 202 and at least two sensors 212. The internal power storage 203 may be a battery, internal fuel cell or any other internal power storage as would occur to those skilled in the art. In this embodiment, the disclosure requires no physical tethering to an external power grid 307 or to a base station 108 as the mobile housing 205 travels.

The power storage 203 can store power that is to be transmitted to the car 1, and/or power that is to be received from the car 1.

The embodiment shown in FIG. 10 has a transceiver I 210 that is already tilted where the transmission vector V is horizontal with the ground, or at a zero degree angle. As is true with most embodiments disclosed herein, the transceiver I 210 can tilt between a zero degree angle to a 90 degree angle (wherein vector V is perpendicular with the ground.) When tilted at a zero degree, the transceiver I 210 can align with a transceiver II 10 located on a side of a vehicle, such as those shown in FIG. 6.

Figure 11:
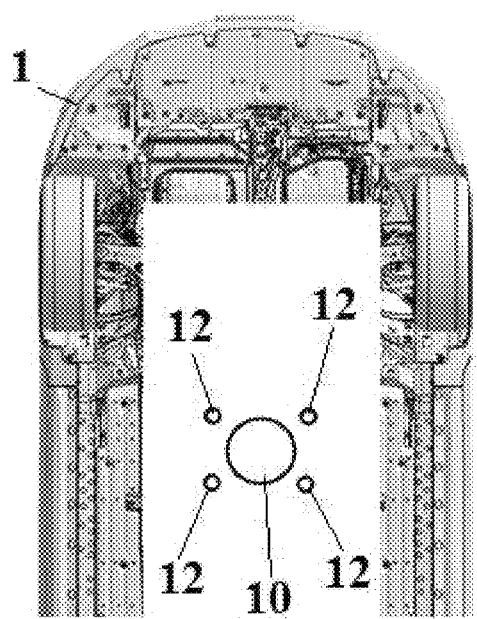
FIG. 11 is a view of a transceiver embedded under a vehicle showing placement of four detachable trackers as an example.

Referring now to FIG. 11, which shows a bottom view of a car 1 having transceiver II 10 embedded therein, and having at least one detachable or permanently attachable tracker 12 (electronic or non-electronic based) placed around transceiver II 10. Trackers 12 are entirely optional and are useful because not all vehicles would be purposely manufactured with electronic trackers to help the power transfer system in the alignment process. The contemplated trackers 12 allows the power transfer system 100 to accurately sense and align to any vehicle by instructing the user or owner of the vehicle 1 to attach these trackers 12 around transceiver II 10. These trackers 12 can be fastened onto the bottom side of the car 1 using various known adhesives or fasteners. Although FIG. 11 shows four detachable trackers 12 placed around transceiver II, it should be understood that FIG. 11 is not limiting with regards to the number and placement of trackers 12 around transceiver II 10.

This disclosure also includes a method of using a mobile power transfer system to wirelessly charge and/or collect power from an object, the method includes the steps of providing a mobile housing having a transceiver I, wherein the mobile housing is configured to freely and autonomously move about the object; sensing a location of a transceiver II on the object; automatically causing a distance between transceiver I of the wireless transfer system and the transceiver II to shorten, and aligning the plane of transceiver I with the plane of transceiver II by tiling at least one of transceiver I and transceiver II; and determining between a transmitting mode and a receiving mode, wherein the transmitting mode transmits power to the object, and wherein the receiving mode receives power from the object. The mobile housing can be either: (a) physically tethered to the base station via only a cable, as the mobile housing freely moves about the object, or (b) not physically tethered to the base station when the mobile housing freely moves about the object, and is configured to dock at the base station when the mobile housing completes transferring power to or from the object. As discussed earlier, the shortened distance can achieve at least one of the following advantages: improve charging efficiency, reduce electromagnetic radiation, and increase power level.

In one contemplated embodiment, the system automatically initiates a sensing step when the object (e.g., a car 1) approaches the system. Also, the initiating step can be performed by at least one sensor and a communication module.

In another embodiment, the method includes automatically moving the transceiver I away from the object when power transfer is completed.

As part of the alignment process, the transceiver I can self-center relative to the transceiver II, using at least one of the following steps: a) detecting and calculating the location of a center of a coil in the second transceiver; b) physically coupling into a centering position based on a corresponding coupling shape between the first transceiver and the second transceiver; and c) detecting the locations of a least two detachable trackers previously attached near the second transceiver.

Thus, specific embodiments and applications of a wireless power transfer system have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc.

What is claimed is:

1. An automatic positioning wireless power transfer system to provide wireless power transfer to and from an object in need of said power transfer, said transfer system comprising:
   a mobile housing having a plurality of wheels and an internal power storage entirely contained within the mobile housing, the mobile housing configured to change a direction of travel and automatically sense the object approaching the mobile housing to enjoy a degree of freedom using its plurality of wheels to autonomously go in front of, along sides thereof, under and around the object and a retractable arm to tilt and raise the mobile housing to achieve alignment of a first transceiver of the mobile housing and a second transceiver of the object independent of whether said object occupies a designated space;
   the first transceiver coupled to and disposed on said mobile housing;
   wherein said object has the second transceiver configured to transmit power wirelessly, or to receive power wirelessly, or both;
   wherein said first transceiver is configured to transmit power wirelessly to said second transceiver, and to receive power wirelessly from said second transceiver;
   a control module to detect and automatically align said first and second transceivers;
   wherein said first transceiver is configured to autonomously move in a horizontal direction to align with said second transceiver;
   wherein said first transceiver has a transmission vector, said first transceiver is configured to tilt relative to the mobile housing, thereby causing said vector to tilt between a zero degree angle to a 90 degree angle;
   wherein said control module is configured to automatically determine between a transmitting mode and a receiving mode, wherein the transmitting mode transmits power to the object, and wherein the receiving mode receives power from the object; and
   a base station configured to transfer power to and from said mobile housing, wherein the base station is coupled to a power source.

2. The wireless power transfer system as recited in claim 1, wherein the power source is a power grid, and wherein the mobile housing is either:

(a) physically tethered to the base station via only a cable, as the mobile housing freely moves about the object, or (b) not physically tethered to the base station when the mobile housing freely moves about the object, and transfers power wirelessly with said base station, and wherein said mobile housing has an internal energy storage.

3. The wireless power transfer system as recited in claim 2 further comprising at least one sensor to detect a location of said second transceiver on the object, and a logic to derive a detected location data.

4. The wireless power transfer system as recited in claim 3 further comprising at least one attachable tracker configured to be attached on or about said second transceiver, wherein said at least one sensor senses the at least one attachable tracker to detect said location of the second transceiver.

5. The wireless power transfer system as recited in claim 3 further comprising a communication module configured to transmit data and commands.

6. The wireless power transfer system as recited in claim 3, wherein the at least one sensor is configured to sense an angle of tilt in said second transceiver, and said control module is configured to cause said first transceiver to tilt in response to the angle of tilt.

7. The wireless power transfer system as recited in claim 2, wherein the cable is retractable at a distal end of the cable, or retractable at a proximal end of the cable, or at both ends of the cable.

8. The wireless power transfer system as recited in claim 2, wherein the cable is stored either in the mobile housing or in the base station, or both, and as the mobile housing moves about the object, the cable is extended and retracted.

9. The wireless power transfer system as recited in claim 2 wherein the power storage contained within the mobile housing and requires no tethering to said base station, wherein the power storage is configured to store:

(a) power that is to be transmitted to the object, and/or (b) power that is to be received from the object.

10. The wireless power transfer system as recited in claim 2, wherein the object is one selected from a group consisting of a land vehicle, a water craft, an aircraft, a stationary machine, a mobile machine, a robot, and a solar panel; and wherein the second transceiver is located either at a side, at a top, or at a bottom of the object.

11. A method of using a mobile power transfer system to wirelessly charging and/or collecting power from an object, said method comprising:

providing a mobile housing having a first transceiver, wherein the mobile housing is configured to freely and autonomously move about and automatically sense the object approaching the mobile housing to enjoy a degree of freedom using its plurality of wheels to autonomously go in front of, along sides thereof, under and around the object and a retractable arm to tilt and raise the mobile housing to achieve alignment of a first transceiver of the mobile housing and a second transceiver of the object independent of whether said object occupies a designated space;

sensing a location of a second transceiver on the object;

automatically causing a distance between a first transceiver of the wireless transfer system and the second transceiver to shorten, and aligning a plane of said first transceiver with a plane of said second transceiver by tilting at least one of said first transceiver and said second transceiver;

determining between a transmitting mode and a receiving mode, wherein the transmitting mode transmits power to the object, and wherein the receiving mode receives power from the object;

wherein the mobile housing is either:

(a) physically tethered to the base station via only a cable, as the mobile housing freely moves about the object, or (b) not physically tethered to the base station and the mobile housing freely moves about the object, and transfers power wirelessly with the base station, and wherein said mobile housing has an internal energy storage entirely contained within;

wherein the shortened distance is configured to achieve at least one of the following:

(a) improve charging efficiency, (b) reduce electromagnetic radiation, and (c) increase power level.

12. The method as recited in claim 11 further comprising sensing an angle of tilt in the second transceiver.

13. The method as recited in claim 11 further comprising automatically moving and tilting said first transceiver towards said second transceiver to shorten said distance.

14. The method as recited in claim 11 further comprising automatically moving and tilting said second transceiver towards said first transceiver to shorten said distance.

15. The method as recited in claim 11 further comprising automatic sensing is performed by at least one sensor and a communication module.

16. The method as recited in claim 11 further comprising automatically moving said first transceiver away from said object when power transfer is completed.

17. The method as recited in claim 11, wherein the second transceiver is disposed on at least a side, a top, or a bottom of said object, and wherein said first transceiver is configured to move in x, y, and z coordinates, relative to the mobile housing.

18. The method as recited in claim 11, wherein the first transceiver is configured to self-center relative to said second transceiver, using at least one step selected from a) detecting and calculating the location of a center of a coil in the second transceiver;

b) physically coupling into a centering position based on a corresponding coupling shape between the first transceiver and the second transceiver; and c) detecting the locations of a least two detachable trackers previously attached near the second transceiver.

* * * * *